(12) United States Patent
Mathias et al.

(10) Patent No.: US 7,924,147 B2
(45) Date of Patent: Apr. 12, 2011

(54) TYRE PRESSURE MONITORING APPARATUS

(75) Inventors: Peter Mathias, Alcester (GB); Kevin Rushgrove, Ullingswick (GB); Anthony Lawrence Rutter, Bromsgrove (GB)

(73) Assignee: TRW Limited (GB)

( * ) Notice: Subject to any disclaimer, the term of this patent is extended or adjusted under 35 U.S.C. 154(b) by 425 days.

(21) Appl. No.: 11/358,738

(22) Filed: Feb. 20, 2006

(65) Prior Publication Data

US 2006/0214780 A1 Sep. 28, 2006

Related U.S. Application Data

(63) Continuation of application No. PCT/GB2004/003503, filed on Aug. 16, 2004.

(30) Foreign Application Priority Data

Aug. 20, 2003 (GB) .................................. 0319548.4

(51) Int. Cl.
*B60C 23/00* (2006.01)

(52) U.S. Cl. ............................ 340/442; 340/447; 73/146

(58) Field of Classification Search .................. 340/442, 340/447; 73/146

See application file for complete search history.

(56) References Cited

U.S. PATENT DOCUMENTS

| | | | | |
|---|---|---|---|---|
| 5,544,525 A * | 8/1996 | Peterman et al. | .......... | 73/170.13 |
| 6,486,769 B1 * | 11/2002 | McLean | ..................... | 340/10.32 |
| 6,879,252 B2 * | 4/2005 | DeZorzi et al. | ................ | 340/505 |
| 2001/0035815 A1 * | 11/2001 | Fletcher et al. | .............. | 340/10.6 |
| 2004/0135681 A1 * | 7/2004 | Tsujita | ............................ | 340/442 |
| 2004/0135682 A1 * | 7/2004 | Lin | .................. | 340/447 |
| 2004/0183664 A1 * | 9/2004 | McClelland et al. | ......... | 340/442 |
| 2004/0246101 A1 * | 12/2004 | Cole | ............................ | 340/10.1 |
| 2004/0257202 A1 * | 12/2004 | Coughlin et al. | ............ | 340/5.82 |

FOREIGN PATENT DOCUMENTS

| | | |
|---|---|---|
| EP | 1 197 356 A2 | 1/2002 |
| WO | WO 02/07993 A2 | 1/2002 |

* cited by examiner

*Primary Examiner* — George A Bugg
*Assistant Examiner* — Kerri McNally
(74) *Attorney, Agent, or Firm* — MacMillan, Sobanski & Todd, LLC (57) ABSTRACT

A tire pressure monitoring system comprises an initiator which is arranged to transmit an initiation signal, and at least one corresponding transducer associated with a tire of the vehicle which responds to exposure of the initiation signal from the initiator and is adapted to respond by transmitting a return signal indicating that it has been woken by the initiator, in which the strength of the initiation signal emitted by the initiator is varied across a number of values within a range.

17 Claims, 8 Drawing Sheets

TYRE PRESSURE MONITORING APPARATUS

CROSS-REFERENCE TO RELATED APPLICATIONS

This application is a continuation of International Application No. PCT/GB2004/003503 filed Aug. 16, 2004, the disclosures of which are incorporated herein by reference, and which claimed priority to Great Britain Patent Application No. GB 0319548.4 filed Aug. 20, 2003.

BACKGROUND OF THE INVENTION

This invention relates to tyre pressure monitoring apparatus for vehicles, and to a method of driving a set of initiators of such a system. It also relates to a control system for controlling a tyre pressure monitoring apparatus.

Tyre pressure monitoring (TPM) apparatus are known which comprise a plurality of tyre pressure monitoring transducers fixed to respective wheels of a vehicle. Each transducer includes a pressure sensor and a transmitter which is capable of transmitting an RF signal containing pressure information obtained by the sensor. These RF signals can be received and interpreted by a suitable receiver fitted to the vehicle. If the signal indicates a lower than usual pressure—which could indicate a leaking tyre—an error is flagged and the driver is alerted.

The transducers are often fitted within a tyre or as part of a valve stem. Each transducer may include a battery to provide a viable power source. Alternatively, if a battery-less transducer is used then each of the transducers would include a rechargeable power source such as an inductive loop with charging being achieved by applying a strong electromagnetic field of relatively low frequency LF to the loop. In either case the application of the LF magnetic field causes the transducer to wake up and send out a return signal in response. This field is produced by an initiator which should be fitted to the vehicle close to the transducer. If only one initiator is provided, all transducers would wake at the same time and send back pressure signals in response also at the same time. To prevent this happening each transducer is provided with its own initiator located close by on the vehicle. This allows identical transducers to be used whilst allowing individual transducers to be identified.

A problem can arise where the "correct" transducer on a tyre is in its farthest position from its corresponding initiator whilst a different transducer is in a more favourable position. For example, the correct transducer could be located at the bottom of a wheel, shielded from its initiator by a steel wheel rim whilst the wheel is also turned away on full lock. In prior art TPM systems, all initiators always send out signals strong enough to deal with such a worse case situation and ensure a response is always received. In this case, false returns may be received which come from other transducers on the vehicle in a more favourable position.

BRIEF SUMMARY OF THE INVENTION

In accordance with a first aspect the invention provides a tyre pressure monitoring system comprising an initiator which is arranged to transmit an initiation signal, and at least one corresponding transducer associated with a tyre of the vehicle which responds to exposure of the initiation signal from the initiator and is adapted to respond by transmitting a return signal indicating that it has been woken by the initiator, in which the strength of the initiation signal emitted by the initiator is varied across a number of values within a range.

By increasing, or decreasing, the strength of the transmitted signal the number of instances in which a false return signal (a signal from a different transducer elsewhere on the vehicle) can be reduced.

The initiator may comprise an antenna which defines a resonant circuit, a carrier signal being applied to the antenna which varies in frequency, the signal transmitted from the antenna being at its greatest the closer the frequency is to its resonant frequency all other things being equal.

The carrier signal may be swept, continuously or stepwise, across a range of frequencies starting higher than the resonant frequency and dropping to close to, or on, the resonant frequency. Alternatively, it may start below the resonant frequency and increase towards or on to it. In both cases, the strength of the signal transmitted by the initiator will increase.

In an alternative, the strength could be decreased by moving the frequency of the carrier signal away from the resonant frequency.

The signal transmitted by the initiator may comprise a number of pulses of differing strength.

In a further alternative, the initiator may again include an antenna which may form a resonant circuit, but instead of varying the frequency of the drive signal it may be pulse width modulated with the duty cycle of the PWM signal being varied. Therefore the average power of the PWM signal will be varied, causing the strength of the carrier signal transmitted by the initiator to vary.

Of course, a combination of PWM and frequency sweeping could be used, but it is preferred to apply PWM to a fixed frequency drive signal as it is less complex to implement.

The duty cycle of the PWM signal may initially be a maximum and may be decreased over time to decrease the average power.

The monitoring system may include a carrier signal generating means which generates the appropriate varying drive signals for the initiator. Typically this will comprise a central unit which generates carrier signals for a set of initiators on the vehicle. For a four wheel vehicle, there may be four initiators (or optionally 5 if there is a spare wheel fitted) and four (or 5) corresponding transducers.

The transducer may transmit a return signal which comprises a pressure signal, or some other acknowledgment signal, whenever it is charged to a predetermined level by the signal from the initiator, i.e. whenever the transducer awakes. After a preset time from the end of an initiation signal the transducer may be arranged to go back to sleep until further initiation signals are received.

The tyre pressure monitoring system will include one or more detectors for detecting the signals sent by the transducers after they have been initiated. Signals may comprise a return signal sent after an initiation, perhaps just saying "I am awake" and perhaps including an ID to say "I am device X.Y or Z" or perhaps sending back a pressure reading. The transducers may also send back signals at other times provided they have enough charge to do so, giving periodic pressure readings.

Whenever a "return" signal is detected the transmission of the signal by the initiator may be stopped or otherwise interrupted as the return signal indicates that the initiation has been successful. In this way, the initiator only sends out the lowest strength signal that it needs to in order to activate or waken its associated transducer. This minimises the number of false returns from other transducers on the vehicle.

The detector may monitor return signals received after or during transmission of a signal from the initiator. If more than one return signal is received—indicating that more than one transducer is responding—the strength in the signal sent by the initiator may be reduced and the reduced power signal sent by the initiator. This may be repeated until such time as only one return signal is received indicating that only one transducer is responding. In most instances this will comprise the transducer that corresponds to the initiator and be a correct signal. If more than one signal is received until a further drop in power results in no signals being received, an error is flagged.

In some instances the only transducer left responding may be the wrong transducer. However, the probability of this occurring using a system in accordance with the present invention is much reduced and further signal processing may be used to deal with such false returns. For example, the system may analyse the returns over time to determine where in the vehicle the transducer is located.

Once a single return signal has been received from the corresponding transducer, the strength of the signal sent by the initiator that caused the transducer to send a response is memorised and used is the initially selected strength for any subsequent transmissions. Of course, this assumes the vehicle and hence sensors are stationary which will not always be the case, so it may be advisable to recalibrate the apparatus from time to time. A change in the weather, or replacement or rotation of the wheels around the vehicle will cause a change in strength needed. In that event, if no returns are received at the stored strength, or more than one, the strength is again varied.

In accordance with a second aspect the invention provides a control system for a tyre pressure monitoring apparatus comprising:

a carrier signal generator which is adapted to generate at least one carrier signal;
an output through which the carrier signal from the generator can be applied to at least one initiator fitted to the vehicle, the initiator transmitting a signal whose strength varies in dependence with the properties of the carrier signal;
an input for receiving tyre pressure signals from one or more tyre pressure transducers in response to the signal transmitted by the initiator; and
a processor which is adapted to process the received signals and to vary the parameters of the carrier signal according to the signals received at the input.

The parameters of the carrier signal which may be varied over time by the processor include the signal strength, the average power and the frequency.

The carrier signal generator may generate more than one carrier signal as there will typically be more than one initiator on the vehicle.

It will be appreciated that the processor may be a single processing device located at one point in the vehicle or may comprise a network of devices distributed around the vehicle and connected across a suitable bus.

According to a third aspect the invention provides a computer program which when operating on a processor having an input and an output which causes the processor to provide the control system of the second aspect of the invention.

According to a fourth aspect the invention provides a method of controlling a tyre pressure monitoring apparatus having a plurality of initiators and associated transducers comprising the steps of:

causing one of the initiators to transmit an initiating signal, monitoring for signals transmitted by the transducers in response to the transmitted signal and,
in the event that signals are received from more than one transducer reducing the strength of the signal transmitted by the initiator.

The method may further comprise the step of reducing the strength of the signal until only one transducer responds which may be assumed to be the transducer associated with that initiator. This signal level may subsequently be used for all further transmissions from that initiator.

The method may be applied to all initiators fitted to a vehicle as part of the tyre pressure monitoring system.

Other advantages of this invention will become apparent to those skilled in the art from the following detailed description of the preferred embodiments, when read in light of the accompanying drawings.

DETAILED DESCRIPTION OF THE INVENTION

Figure 1:
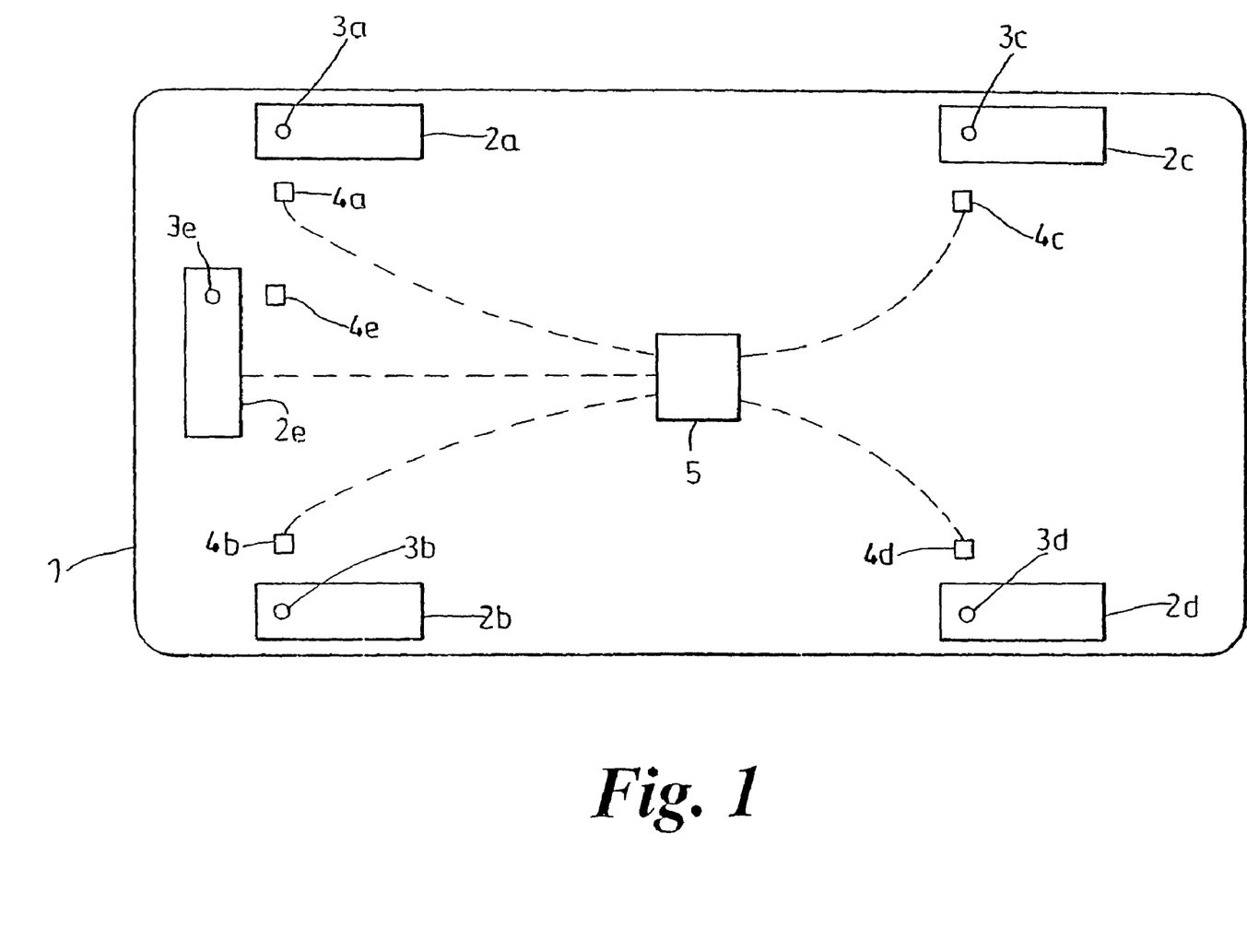
FIG. 1 shows a plan view of a vehicle fitted with a tyre pressure monitoring system according to the present invention.

A car 1 fitted with the tyre pressure monitor according to the present invention is shown in FIG. 1 of the accompanying drawings. The car 1 is provided with four wheels, each having a pneumatic tyre 2a, 2b, 2c, 2d, 2e. Whilst a car is shown in this example, the invention can be used with any vehicle with pneumatic tyres, such as pedal cycles, motorcycles, cars, busses, lorries, trolleybuses or light aircraft. The car is also provided with a spare wheel with its own tyre 2e.

Each wheel is provided with a pressure sensor 3a, 3b, 3c, 3d, 3e mounted on the rim in the interior of each tyre 2a, 2b, 2c, 2d, 2e. An initiator 4a, 4b, 4c, 4d, 4e is provided on the body of the car 1 adjacent to each wheel, the initiator being controlled by a control unit 5. The control unit 5 periodically causes each initiator 4a, 4b, 4c, 4d, 4e to transmit a LF signal, which acts to activate the adjacent pressure sensor 3a, 3b, 3c, 3d, 3e. The sensors 3 are adapted to measure the pressure within the tyres 2 and transmit an RF signal encoded with pressure data and an ID signal. These signals are received by the control unit 5 and processed appropriately.

Figure 2:
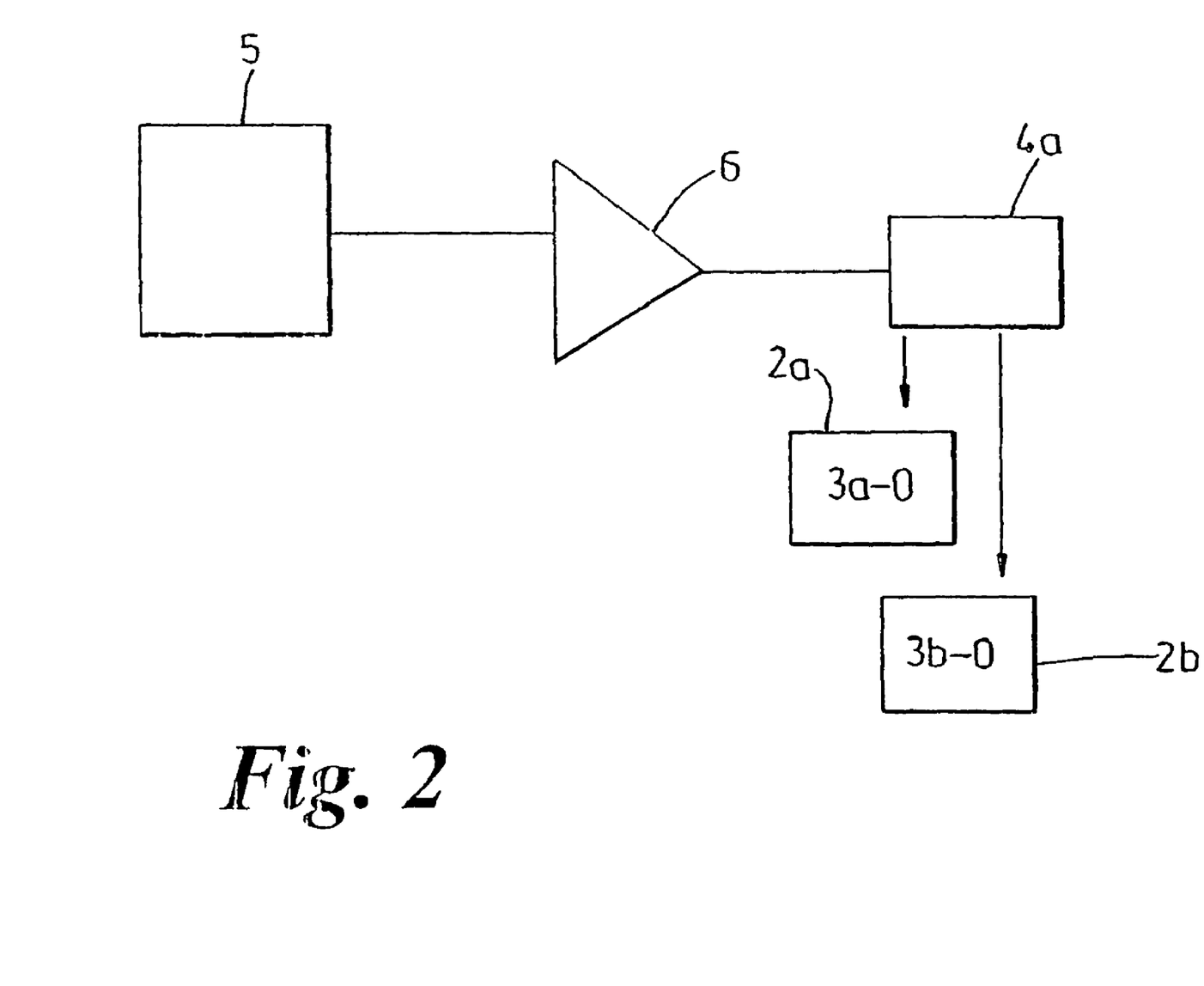
FIG. 2 shows a block diagram of a first embodiment of the tyre pressure monitoring system of FIG. 1.
Figure 3:
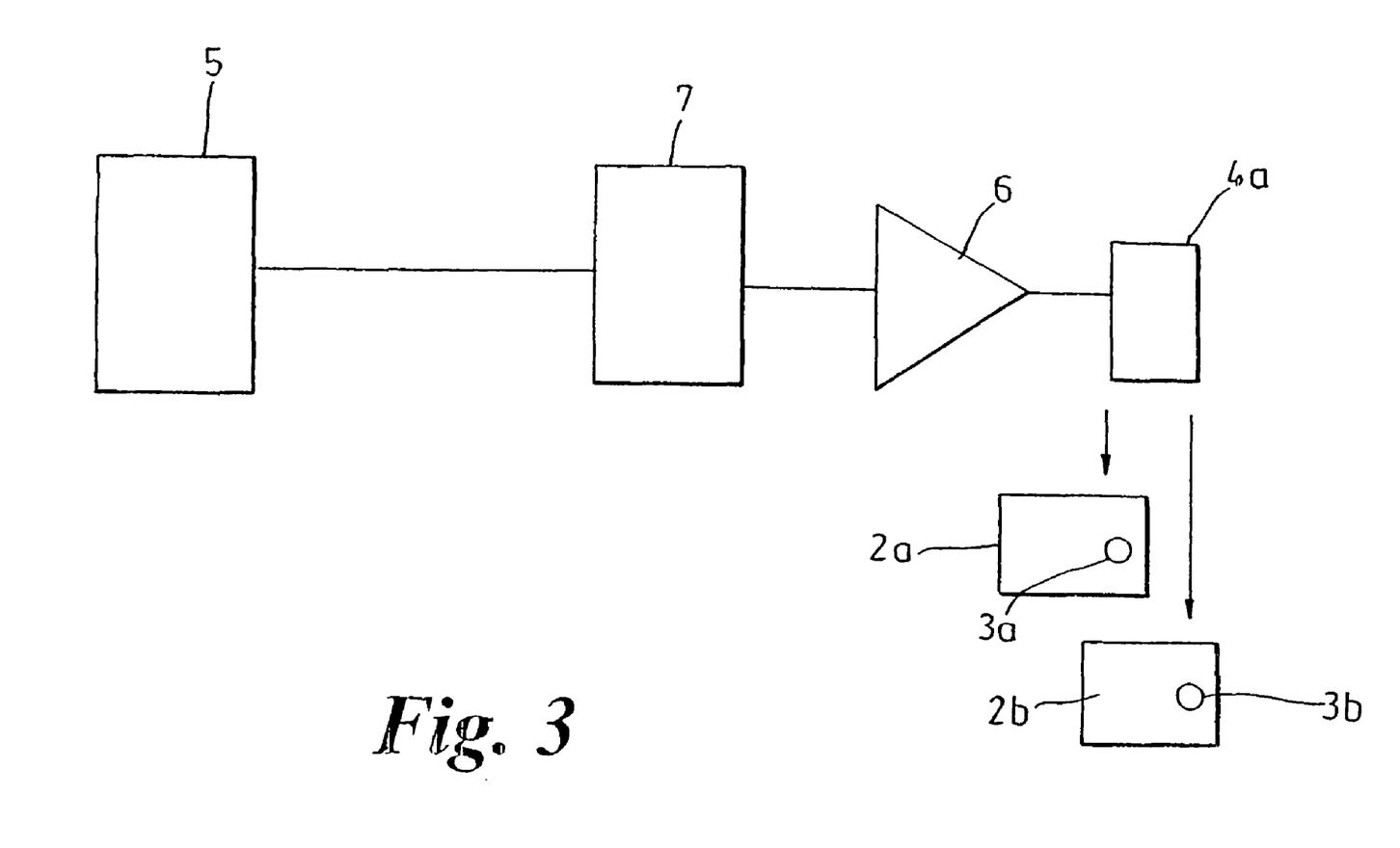
FIG. 3 shows a block diagram of a second embodiment of the tyre pressure monitoring system of FIG. 1.

Further details of two embodiments showing how the control unit 5 can cause the initiators 4a, 4b, 4c, 4d, 4e to transmit the LF signals can be seen in FIGS. 2 and 3 of the accompanying drawings. In the first embodiment shown in FIG. 2 of the accompanying drawings, the control unit 5 generates the LF signal and passes it to a switching amplifier 6. The amplifier is typically uses a class-D output stage for best efficiency. The amplified signal is passed directly to the relevant initiator (in FIG. 2, shown as 4a but there would be an equivalent circuit for each initiator 4a, 4b, 4c, 4d, 4e).

Each initiator 4a, 4b, 4c, 4d, 4e is of the form of a magnetic antenna. Each initiator forms a resonant circuit, with an inductive part (typically a coil) and a tuning capacitance being provided such that the resonant frequency of each initiator can be adjusted. The amplified LF signal will therefore be transmitted from the initiator.

FIG. 2 of the accompanying drawings also show how LF transmitted signals can not only be picked up by the pressure sensor mounted in the tyre closest to the initiator (in this case, sensor 3a in tyre 2a) but also by those of other wheels (for example, sensor 3b of wheel 2b). This is especially relevant as the pressure sensors 3 rotate with the wheels so that the positions of the sensors 3 are not fixed with respect to the initiators 4.

FIG. 3 of the accompanying drawings show an alternative, second, embodiment of a circuit used to cause the initiators 4 to transmit LF signals. This embodiment is very similar to the first embodiment, and equivalent integers have been given identical reference indicia. When control unit 5 determines that it is necessary for a certain initiator (FIG. 3 of the accompanying drawings shows only initiator 4a; equivalent circuits would be provided for each initiator 4a, 4b, 4c, 4d, 4e) to transmit a LF signal, the control unit transmits a data stream to a processor 7 local to the initiator 4a. The processor 7 acts as a signal generator, controlled by the contents of the data stream. Again, the generated signal is amplified by a switching amplifier 6 and transmitted by the initiator 4a as in the first embodiment. Furthermore, the Figure again shows how the LF signal will be transmitted not only to the relevant pressure sensor 3a, but may be received by other pressure sensors as typified by sensor 3b.

It can therefore be seen that it is important to ensure that the LF signals transmitted by the initiators 4 are of the correct strength to actuate the pressure sensors 3 of the relevant wheels without actuating others. This may be achieved according to the invention by using either of the following methods.

Figure 4:
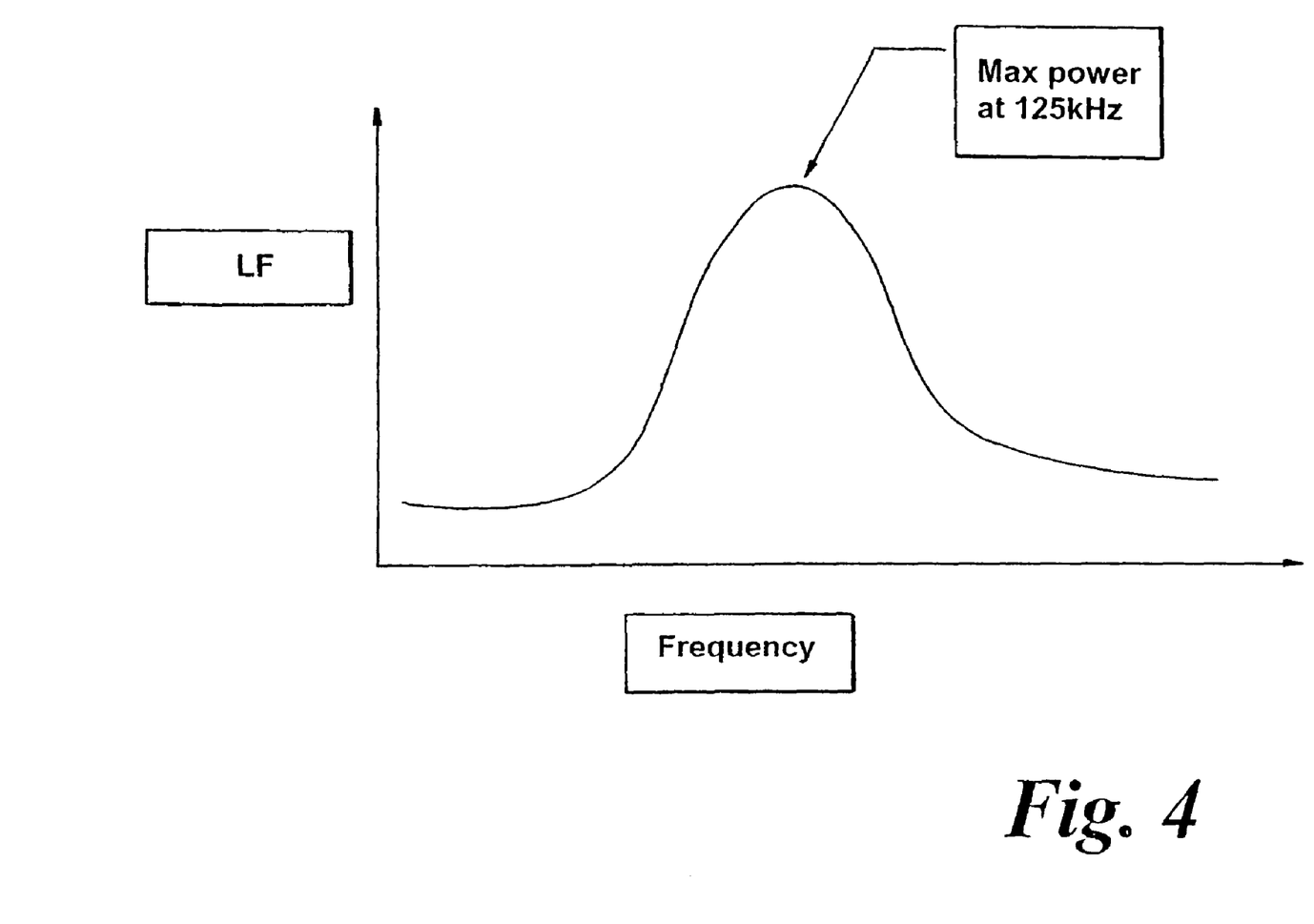
FIG. 4 shows a curve of signal strength against frequency for a resonant circuit.
Figure 5:
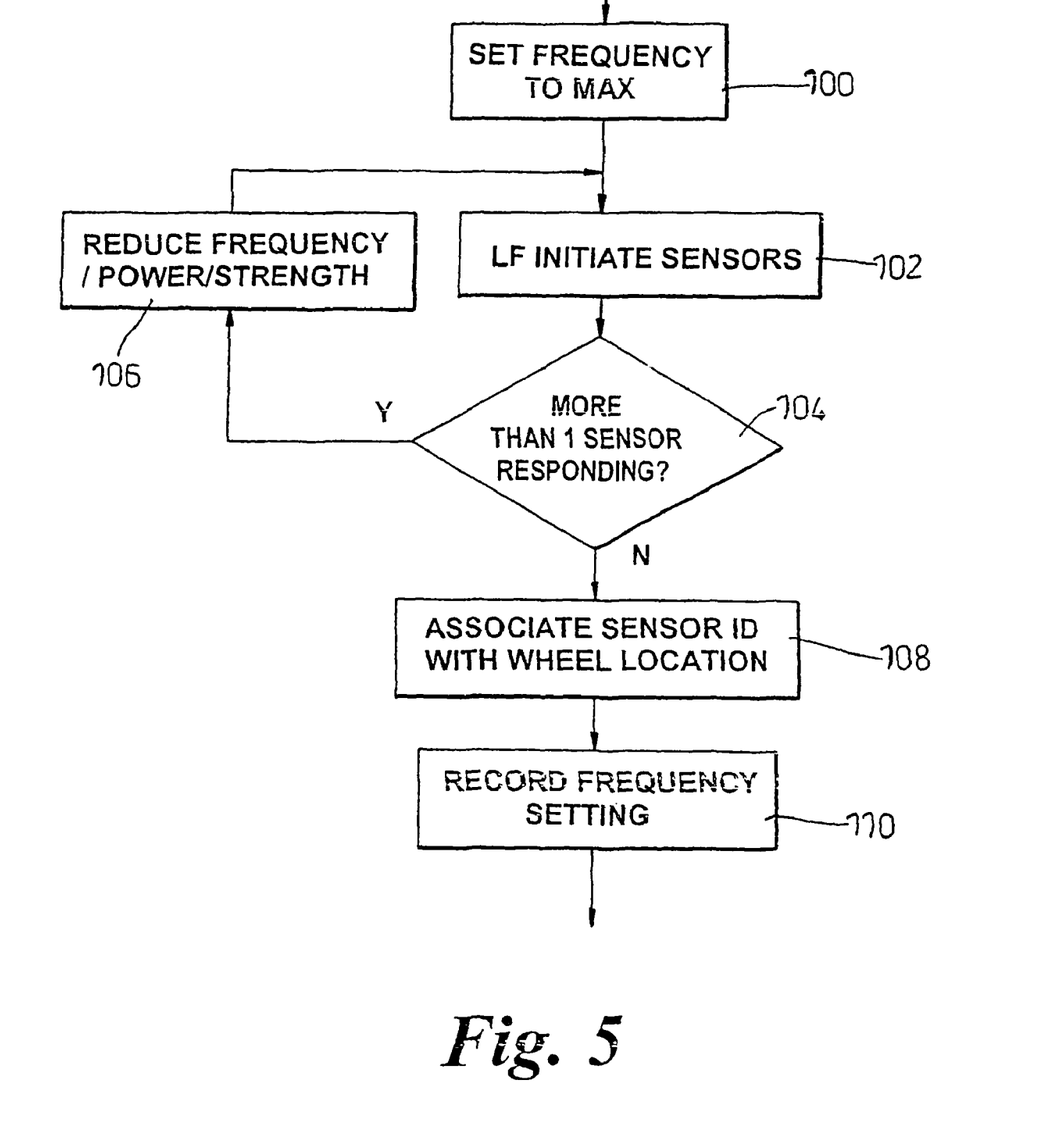
FIG. 5 shows a flow chart showing a first method of controlling the initiators of the tyre pressure monitoring system of FIG. 1.
Figure 6:
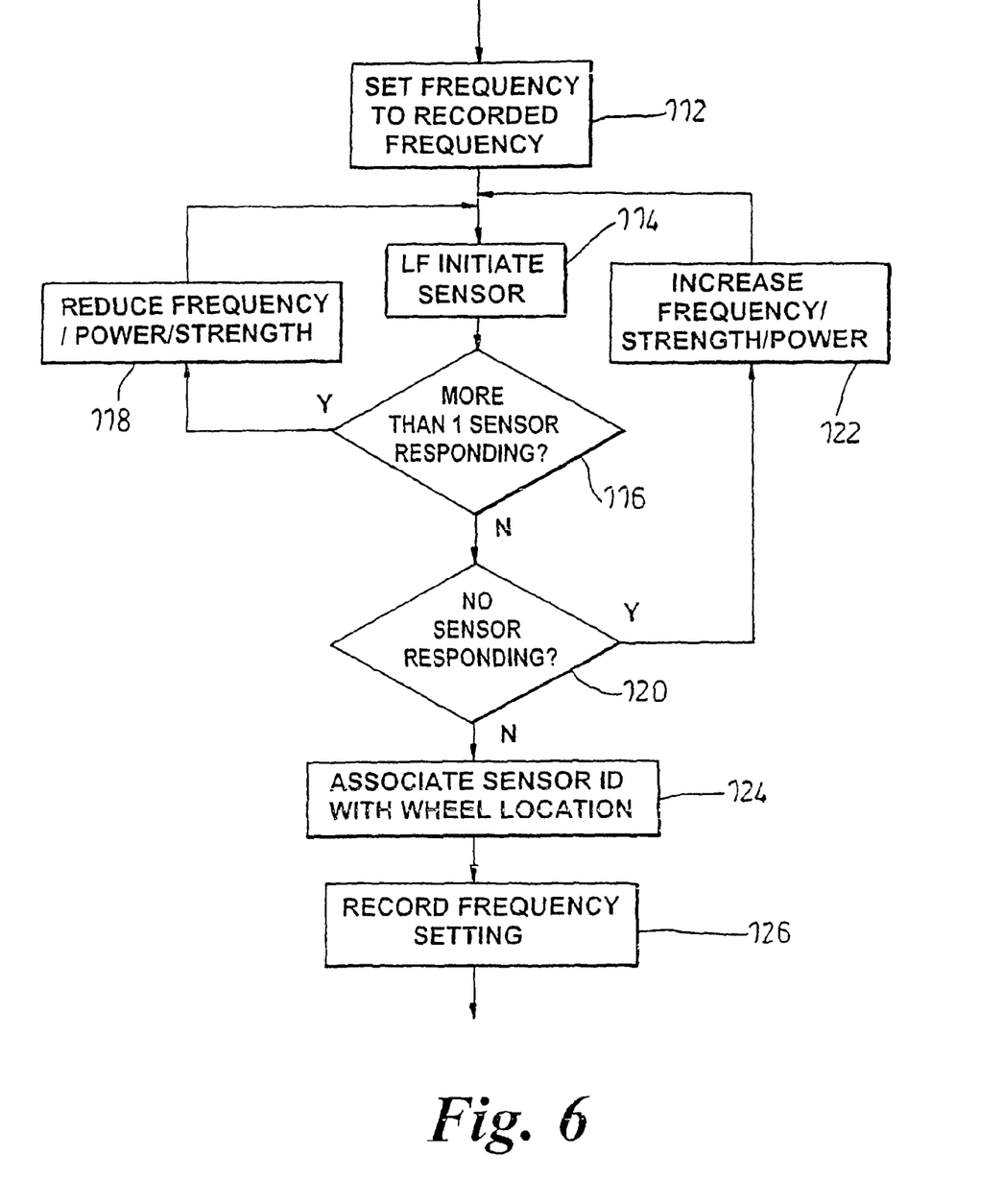
FIG. 6 shows a flow chart showing the continuation of the method of FIG. 5.

In the first method, depicted in FIGS. 5 and 6 of the accompanying drawings, uses the phenomenon that the peak power consumption of a resonant circuit occurs at its resonant frequency (all other variables being constant), as depicted in FIG. 4 of the accompanying drawings. The resonant frequency will depend upon the inductance and capacitance of the circuit (according to $$f_0 = \frac{1}{2\pi\sqrt{LC}},$$

where $f_0$ is the resonant frequency, L the inductance and C the capacitance). The width of the peak will depend on the quality value Q of the resonant circuit. There is a corresponding desensitisation of the receiving circuit in each sensor 3a, 3b, 3c, 3d, 3e, which have their own Q. Accordingly, varying the frequency of the LF signal applied to the initiators 4 will vary the strength of the LF signal transmitted by the initiators 4. The graph of FIG. 4 of the accompanying drawings shows the power of the transmitted against frequency applied by a particular initiator that happens to have a resonant frequency of 125 kHz, but is preferably below 135 kHz. The range of frequencies over which it is envisaged this embodiment will transmit is 100 kHz to 150 kHz.

In order to determine the power with which to transmit, the steps of the method shown in FIGS. 5 and 6 of the accompanying drawings is carried out. This will be carried out separately for each initiator 4a, 4b, 4c, 4d, 4e. In step 100, the frequency with which the initiators are to transmit is set to the resonant frequency of the initiator by the control unit. This may be a factory preset (by use of the tuning capacitance), or may be measured and stored in a non-volatile memory of the control unit.

At step 102, the control unit 5 causes the relevant initiator 4 to transmit at the set frequency. The control unit then monitors for RF signals received from the sensors 3. At step 104, it is determined whether more than one pressure sensor 3 has responded. If so (step 106), the signal strength at which the initiator is to transmit is reduced by moving the frequency up or down (typically down) relative to the resonant frequency of the circuit by a suitable, predefined, increment. The transmission is then repeated (step 102) until only one sensor 3 responds.

If only one sensor responds, then an ID transmitted by the sensor along with the pressure data can be associated with the initiator (step 108). The pressure data transmitted can be displayed to a driver of a vehicle as belonging to the tyre 2a, 2b, 2c, 2d, 2e at the relevant position. The frequency at which only one sensor 3a, 3b, 3c, 3d, 3e responded is recorded (step 110) as the appropriate frequency at which to transmit the LF signals.

If no sensor 3 responds to the LF signal, an error condition is signaled and the driver of the vehicle alerted. Several attempts may be made to initiate the relevant sensor before it is deemed to have failed.

Once a sensor 3a, 3b, 3c, 3d, 3e has been associated with the relevant initiator 4a, 4b, 4c, 4d, 4e, repeated initiations can be made with the appropriate initiator 4a, 4b, 4c, 4d, 4e at the determined frequency. However, as the position of the sensors 3 change relative to the initiators 4 and environmental changes cause differing transmission and reception conditions, it is desirable to periodically—perhaps even as frequently as every transmission—re-determine the appropriate powers and hence frequencies at which the initiators are to transmit. Accordingly, the steps of FIG. 6 of the accompanying drawings can be carried out.

Initially (step 112), the transmission frequency is set by the control unit 5 to be the previously determined transmission frequency (for example, from step 110 above). Again (step 114), the initiator 4 is caused to transmit at the relevant frequency. The control unit 5 then waits for received signals, and determines (step 116) whether more than one sensor 3a, 3b, 3c, 3d, 3e is responding. If so, the power to be transmitted is reduced by shifting the frequency away from the resonant frequency (step 118). The method then repeats from the transmission step 114.

If not more than one sensor 3a, 3b, 3c, 3d, 3e is responding, the control unit 5 determines (step 120) whether no sensor is responding. If no sensor is responding, then strength of the transmitted signal must be increased and so the frequency at which the initiator is to be transmitted is moved closer to the resonant frequency (step 122). The method then repeats from the transmission step 114.

However, if precisely one sensor is responding, then this can be safely associated with the relevant initiator 4a, 4b, 4c, 4d, 4e location (step 124). The frequency can then be recorded (step 126) for future use, and can be reused in the method of FIG. 6 of the accompanying drawings for future recalibrations.

Accordingly, this method will continually ensure that the LF signal transmitted by each initiator 4a, 4b, 4c, 4d, 4e is transmitted at such a power (by varying the frequency) that one and only one sensor 3a, 3b, 3c, 3d, 3e responds to the LF signal. The responding sensor 3a, 3b, 3c, 3d, 3e can therefore be assumed to be the sensor 3a, 3b, 3c, 3b associated with the relevant initiator 4a, 4b, 4c, 4d, 4e.

Figure 7:
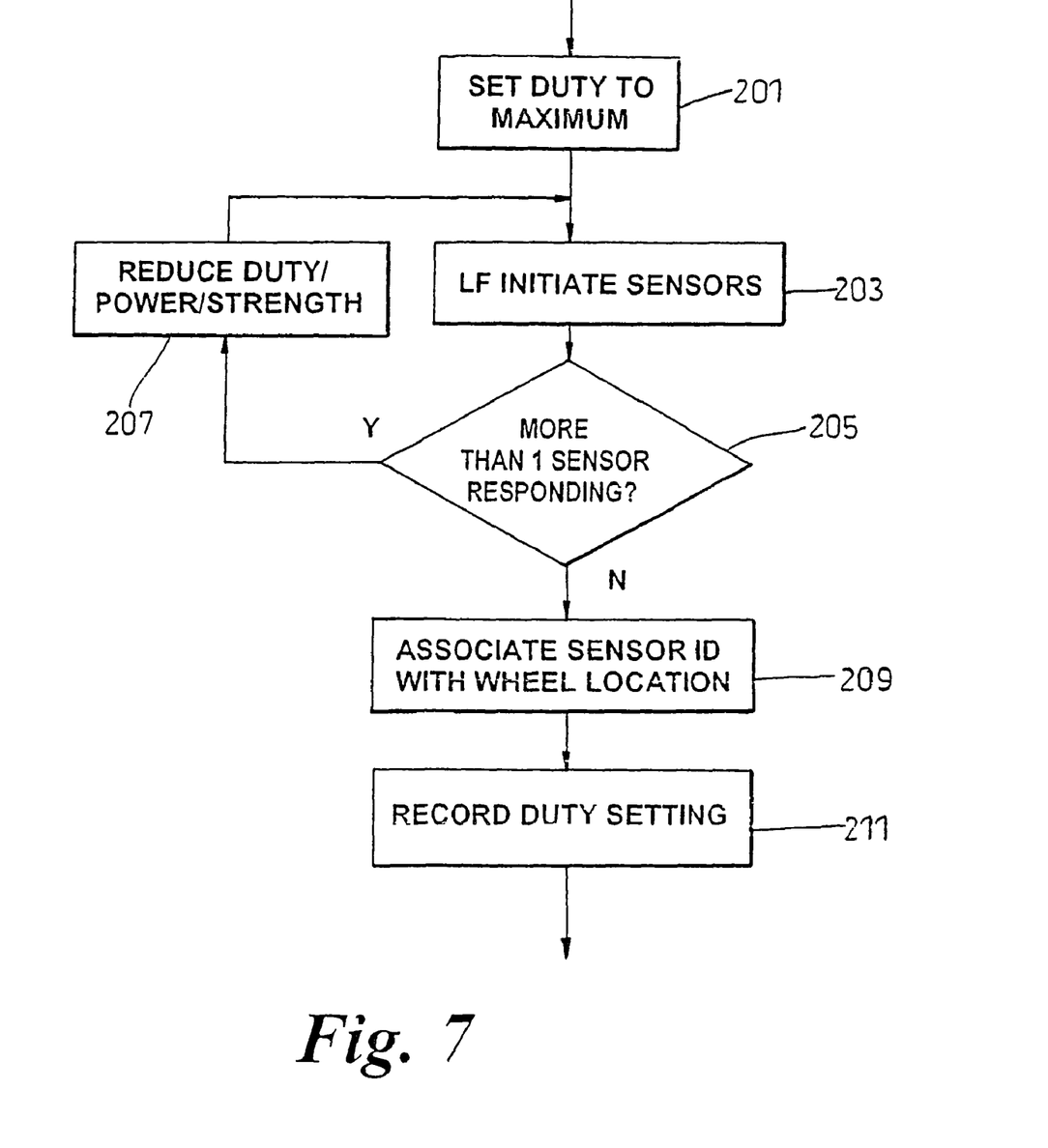
FIG. 7 shows a flow chart showing a second method of controlling the initiators of the tyre pressure monitoring system of FIG. 1.
Figure 8:
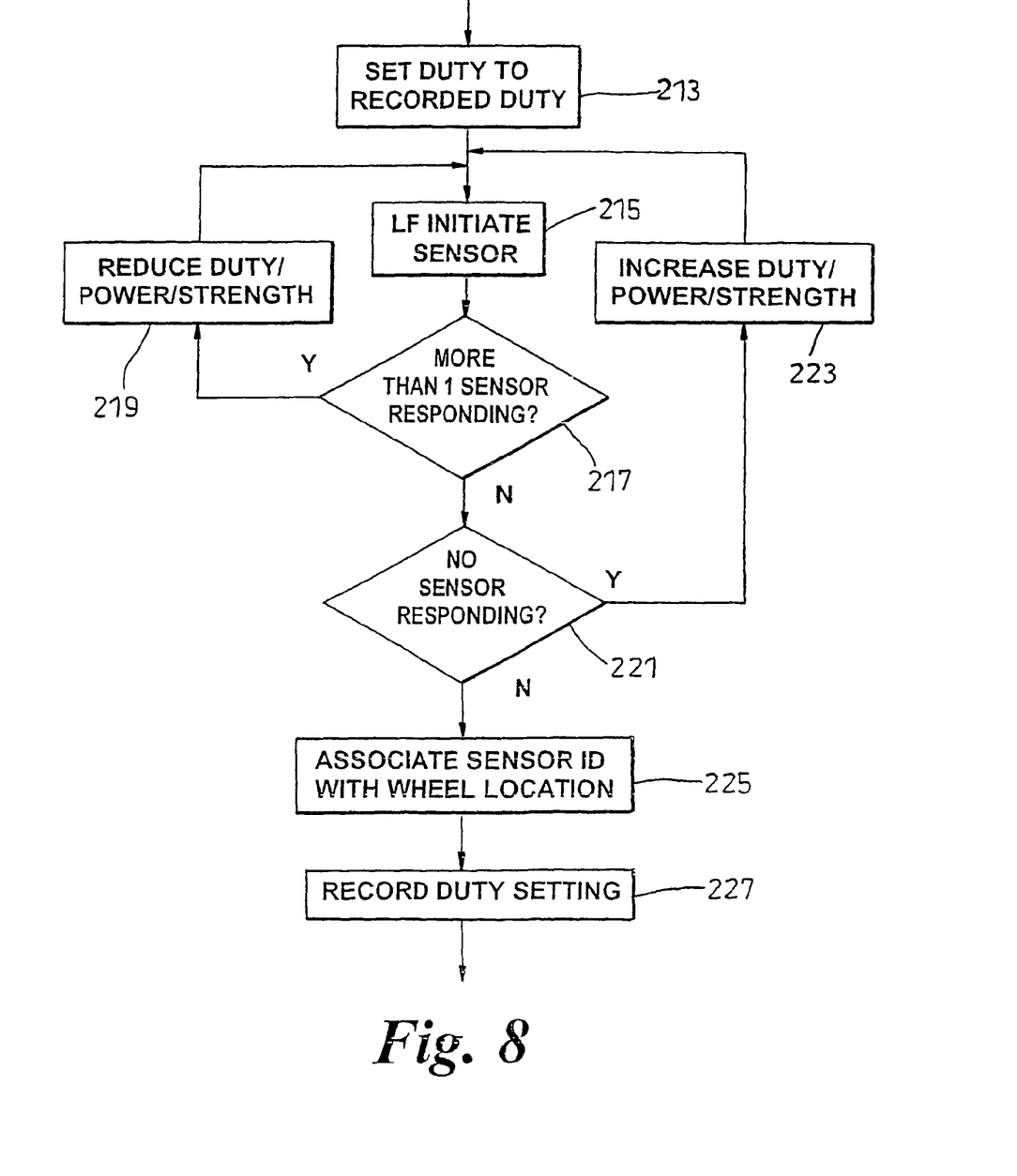
FIG. 8 shows a flow chart showing the continuation of the method of FIG. 7.

In an alternative method shown in FIGS. 7 and 8 of the accompanying drawings, the power output by the initiator is controlled by pulse width modulation of the LF signal (rather than the frequency modulation of the previous embodiment). Varying the duty cycle (the ratio of pulse to space) of the LF signal will vary the strength of the signal that is transmitted and hence the range of the LF signal. Other than the pulse width modulation, the LF signal can be transmitted at the resonant frequency of the initiator, in this case 125 kHz. In this embodiment, the resonant circuit acts as a filter to reduce harmonic radiation.

In order to initially determine the strength with which the LF signal is to be transmitted, the method of FIG. 7 of the accompanying drawings is carried out. This method corresponds to the method of FIG. 5 of the accompanying drawings for the previous method. This method is to be carried out separately for each initiator 4a, 4b, 4c, 4d, 4e. Initially (step 201), the control unit 5 sets the duty cycle of the LF signal to be transmitted to the maximum (typically 100% pulse, that is a continuous wave). The control unit 5 then causes the relevant initiator 4a, 4b, 4c, 4d, 4e to transmit the required LF signal (step 203). The control unit 5 determines (step 205) whether more than one sensor 3 is responding to the LF signal. If so, the control unit 5 reduces the duty cycle of the LF signal to be transmitted (step 207). The method then repeats from the transmission step 203.

If one sensor 3a, 3b, 3c, 3d, 3e responds, then this can be assumed to be the sensor 3a, 3b, 3c, 3d, 3e associated with the relevant initiator 4a, 4b, 4c, 4d, 4e. The control unit 5 therefore associates (step 209) an ID transmitted by the sensor 3a, 3b, 3c, 3d, 3e with the relevant initiator 4a, 4b, 4c, 4d, 4e and pressure data transmitted by the sensor 3a, 3b, 3c, 3d, 3e can be displayed to a driver of the car. The duty ratio is then recorded (step 211) for future transmissions.

In order to re-calibrate the duty ratio with which LF signals are to be transmitted, the method of FIG. 8 of the accompanying drawings is carried out. This can be carried out periodically, even as frequently as on every transmission. The method is broadly similar to that of FIG. 6 of the accompanying drawings for the first method.

Initially (step 213), the duty ratio with which the LF signal is to be transmitted is set to the previously determined value. The control unit 5 then causes the initiator to transmit the required LF signal (step 215). The control unit determines (step 217) whether more than one sensor is responding and, if so (step 219) reduces the duty cycle of the LF signal to be transmitted. If not, the control unit determines (step 221) whether no sensor is responding, and if so (step 223) increases the duty cycle of the LF signal to be transmitted. In either case, the method then repeats from the transmission step 215.

If one and only one sensor is responding to the LF signal, the sensor 3a, 3b, 3c, 3d, 3e can be assumed to be associated with the relevant initiator 4a, 4b, 4c, 4d, 4e and so the relevant ID is associated (step 225) by the control unit 5 with the correct initiator 4a, 4b, 4c, 4d, 4e. The duty setting can therefore be recorded (step 227) for future use.

Whilst either method is equally functional, the first method of FIGS. 5 and 6 of the accompanying drawings is preferred as it can be software controlled, with no extra hardware required other than the control unit 5 already present for a tyre pressure monitor system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A tyre pressure monitoring system for a vehicle comprising:
   at least two tyre pressure transducers, each transducer being associated with a tyre of the vehicle; and
   at least two initiators each of which is associated with a corresponding one of said transducers, each of said initiators being operable to transmit an initiation signal with said transducers responding to exposure from said initiation signals by transmitting a return signal indicating that it has been woken by one of said initiation signals, each initiator being located in a position on the vehicle that is close to said transducer associated with said initiator with said initiator detecting a response only from its associated transducer when said associated transducer is a favorable position and the other transducer is an unfavorable position, but with said initiator also receiving a response from said other transducer only when said other transducer is in a favorable position and not receiving the response from its associated transducer when said associated transducer is in a least favorable position, each of said initiators further arranged to vary the strength of said initiation signal emitted by said initiator across a number of values within a range until the signal strength is such that the response is received from only one of said transducers.

2. The tyre pressure monitoring system according to claim 1 wherein each of said initiators includes an antenna which defines a resonant circuit, a carrier signal being applied to said antenna which varies in frequency, said initiation signal transmitted from said antenna with said initiation signal being at its greatest strength the closer said frequency is to a resonant frequency of said resonant circuit.

3. The tyre pressure monitoring system according to claim 2 wherein said initiators are operable to sweep said carrier signal across a range of frequencies.

4. The tyre pressure monitoring system according to claim 3 wherein said carrier signal sweep starts higher than said resonant frequency and drops towards said resonant frequency.

5. The tyre pressure monitoring system according to claim 3 wherein said carrier signal sweep starts at a frequency lower than said resonant frequency and increases towards said resonant frequency.

6. The tyre pressure monitoring system according to claim 1 wherein each said initiation signal transmitted by each said initiator comprises a number of pulses of differing strength.

7. The tyre pressure monitoring system according to claim 1 which further includes a carrier signal generating means which generates varying drive signals for said initiators.

8. The tyre pressure monitoring system according to claim 1 wherein said return signals transmitted by said transducers each comprise a pressure signal whenever said transducers are charged to a predetermined level by said initiation signals from said initiators.

9. The pressure monitoring system according to claim 1 wherein said initiators are adapted to stop sending said initiation signals upon receipt of said return signals.

10. A tyre pressure monitoring system for a vehicle comprising:
    an initiator which is arranged to transmit an initiation signal having a strength; said initiator including an antenna which forms a resonant circuit, and which emits an initiation signal which is pulse width modulated, a duty cycle of said pulse width modulated initiation signal being varied to vary the strength of said initiation signal; and at least one corresponding tyre pressure transducer associated with a tyre of the vehicle, said at least one transducer responding to exposure from said initiation signal from said initiator, and said transducer being operable to respond by transmitting a return signal indicating that it has been woken by said initiator, said initiator further adapted to vary the strength of said initiation signal emitted by said initiator across a number of duty cycle values within a range for identification of the tyre associated with said at least one transducer.

11. The tyre pressure monitoring system according to claim 10 wherein said duty cycle of said pulse width modulated initiation signal is initially set at a maximum duty cycle value and is decreased over time to decrease an average power of said signal modulated.

12. The tyre pressure monitoring system according to claim 11 wherein the system includes a detector and further wherein said detector monitors said return signal and if more than one return signal is received indicating that more than one transducer is responding, said initiator sends an initiation signal having reduced power.

13. A control system for a tyre pressure monitoring apparatus for a vehicle comprising:
a carrier signal generator which is operable to generate at least one carrier signal;
at least two tyre pressure transducers, each transducer being associated with a tyre of the vehicle;
an output through which said at least one carrier signal from said carrier signal generator can be applied to at least-two initiators fitted to said vehicle, each of said initiators transmitting an initiation signal whose strength varies in dependence with properties of said at least one carrier signal, each initiator being located in a position on the vehicle that is close to one of said transducers that is associated with said initiator with said initiator detecting a response only from its associated transducer when said associated transducer is a favorable position and the other transducer is an unfavorable position, but with said initiator also receiving a response from said other transducer only when said other transducer is in a favorable position and not receiving the response from its associated transducer when said associated transducer is in a least favorable position;
an input for receiving said responses from said tyre pressure transducers in response to said initiation signal transmitted by said initiator; and
a processor which is operable to process said received responses and to vary at least one parameter of said carrier signal according to said signals received until the response is received from only one of said transducers.

14. The control system according to claim 13 wherein said processor varies at least one of: strength of said carrier signal, average power of said carrier signal and frequency of said carrier signal.

15. The control system according to claim 14 further including a computer program for said processor, said computer program operative with said processor to operate the control system.

16. A method of controlling a tyre pressure monitoring apparatus comprising the steps of:
(a) providing a plurality of initiators and associated tyre pressure transducers, each of the initiators comprising an antenna which defines a resonant circuit, each initiator being located in a position on a vehicle that is close to a transducer associated with the initiator with the initiator detecting a response only from its associated transducer when the associated transducer is in a favorable position and the other transducers are in an unfavorable position, but with the initiator also receiving a response from another transducer only when the other transducer is in a favorable position and not receiving the response from its associated transducer when the associated transducer is in a least favorable position, and a carrier signal generator which is operable to generate a carrier signal that is applied to each of the antennas and is swept across a range of frequencies in accordance with one of starting higher than the resonant frequency and sweeping towards said resonant frequency and starting lower than the resonant frequency and sweeping towards said resonant frequency, an initiation signal transmitted from said antenna being at its greatest strength the closer said frequency is to a resonant frequency of said resonant circuit;
(b) causing one of the initiators to transmit the initiation signal;
(c) monitoring for signals transmitted by the transducers in response to said initiation signal;
(d) reducing a strength of the initiation signal transmitted by the initiator if signals are received from more than one transducer; and
(e) identifying the tyre associated with the transducer if a signal is received from only one transducer.

17. A tyre pressure monitoring system for a vehicle comprising:
at least two tyre pressure transducers, each transducer being associated with a tyre of the vehicle; and
at least two initiators that are arranged to transmit an initiation signal having a strength, each initiator comprising an antenna which defines a resonant circuit, each initiator being located in a position on the vehicle that is close to a transducer associated with the initiator with the initiator detecting a response only from its associated transducer when the associated transducer is a favorable position and the other transducers are in an unfavorable position, but with the initiator also receiving a response from another transducer only when the other transducer is in a favorable position and not receiving the response from its associated transducer when the associated transducer is in a least favorable position; and
a carrier signal generator which is operable to generate a carrier signal that is applied to one of said initiator antennas and which sweeps across a range of frequencies in accordance with one of starting higher than said resonant frequency and sweeping towards said resonant frequency and starting lower than said resonant frequency and sweeping towards said resonant frequency, said initiation signal transmitted from said antenna being at its greatest strength the closer said frequency is to a resonant frequency of said resonant circuit, said transducers responding to exposure from said initiation signal from said initiator by transmitting a return signal indicating that it has been woken by said initiator, said initiator further adapted to vary the strength of said initiation signal emitted by said initiator across a number of values within a range for identification of the tyre associated with said one of said transducers.

* * * * *